Feb. 17, 1970  H. LAUB  3,495,441
LEAK DETECTOR
Original Filed Oct. 22, 1965  4 Sheets-Sheet 1

INVENTOR.
HERMAN LAUB
BY
ATTORNEY

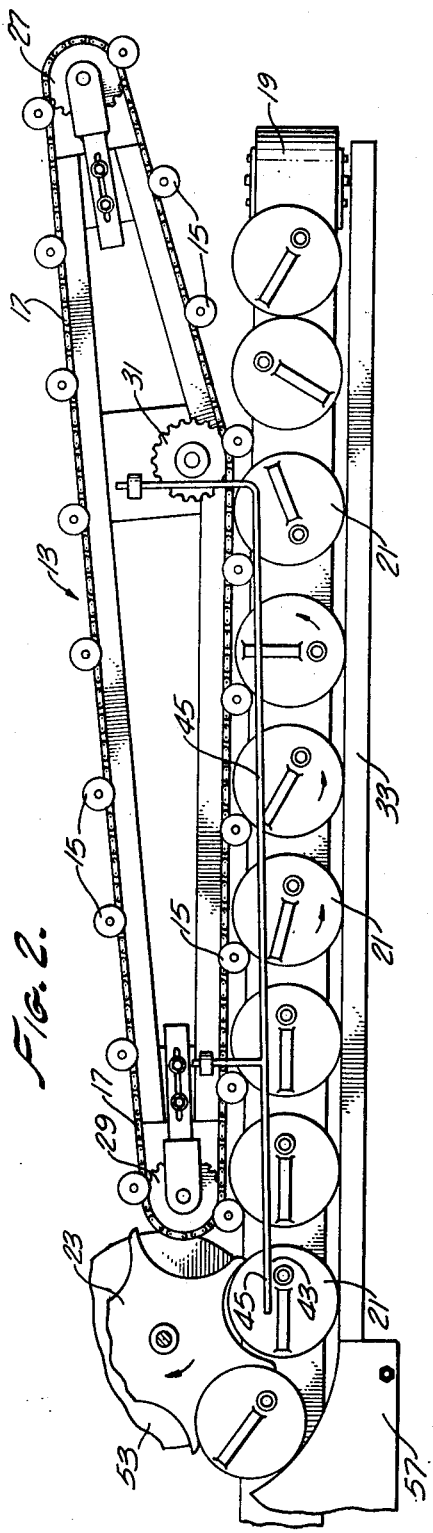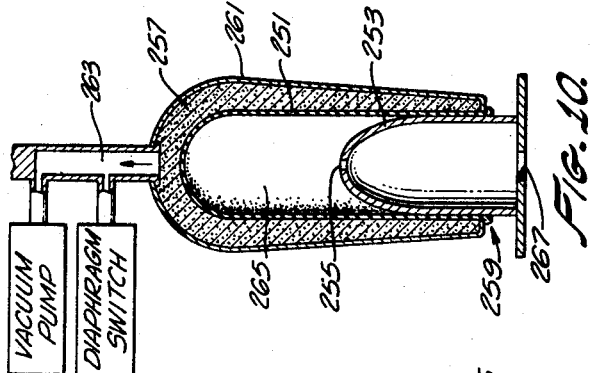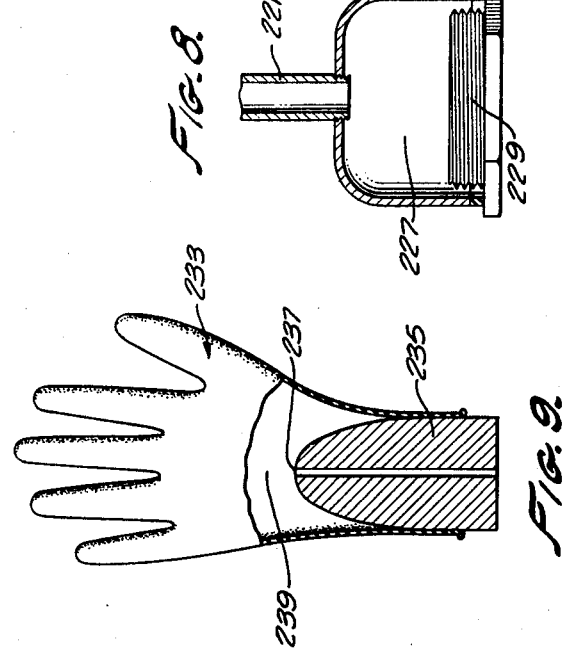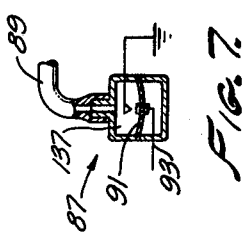

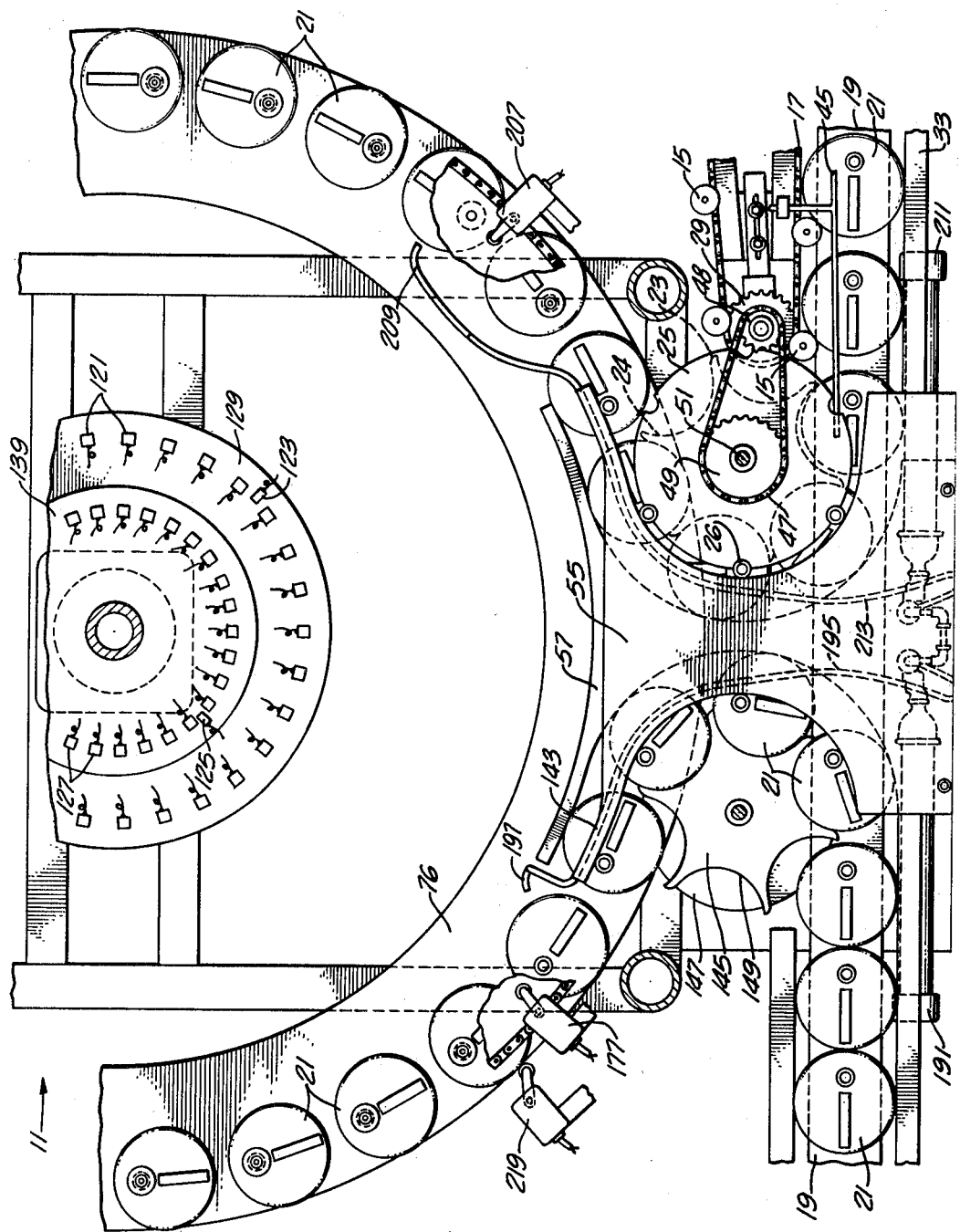

INVENTOR.
HERMAN LAUB
BY
ATTORNEY

United States Patent Office 3,495,441
Patented Feb. 17, 1970

3,495,441
LEAK DETECTOR
Herman Laub, 244 N. San Marino Ave.,
San Gabriel, Calif. 91775
Continuation of application Ser. No. 501,017, Oct. 22,
1965. This application Oct. 23, 1967, Ser. No. 677,477
Int. Cl. G01m 3/04
U.S. Cl. 73—45.2                  17 Claims

ABSTRACT OF THE DISCLOSURE

An apparatus is disclosed for testing for leaks in plastic containers. The leak detector utilizes a skate-wheel conveyor mechanism to automatically feed the containers to test stations where leaks are detected by the air pressure differential resulting therefrom. Various combinations of solenoids, relays and brushes and commutators are utilized. Containers which have leaks greater than a predetermined maximum are automatically ejected from the apparatus.

---

This is a continuation of application Ser. No. 501,017, filed Oct. 22, 1965, now abandoned.

There are a great number of containers being used in industry today for all sorts of products, including very caustic materials. Very many of these bottles or containers are made of plastic and the trend today is more and more to replace glass containers by plastic ones. It is very important for the manufacturer to be able to be certain that the plastic containers do not have any leaks which will allow the contents thereof to leak out.

It is also important, in the case of bungs, pop-top lids and containers such as rubber gloves worn by surgeons, and rubber prophylactics or condems, to detect small leaks or holes which would allow small organisms to pass through and contaminate either the contents, patient or user.

It is an object of the present invention, therefore, to provide a novel leak detector.

It is another object of the present invention to provide apparatus for testing containers and related devices for leaks.

It is still another object of the present invention to provide a tester for automatically detecting the existence of small leaks in containers and other devices.

It is yet another object of the present invention to provide a tester which will automatically reject containers or other devices which which have small leaks.

According to one embodiment of the present invention, a leak detector comprises a skate-wheel conveyor mechanism for automatically feeding bottles or containers to an in-feed star mechanism which enables a cam follower assembly to insert a spout within the bottle being tested. The tester contains a number of test stations and each test station has a cam follower assembly.

A diaphragm switch and a solenoid, or a mercury switch and a four-way valve are connected to each station. This switch or valve enables the apparatus to detect a leak and triggers the necessary mechanism to eject the defective container.

The features of the present invention which are believed to be novel are set forth with particularity in the appended claims. The present invention, both as to its organization and manner of operation, together with further objects and advantages thereof, may be best understood by reference to the following description, taken in connection with the accompanying drawings, in which:

FIGURE 2 is a detailed view of the skate-wheel assembly portion of FIGURE 1.

FIGURE 4 shows the in-feed and discharge stars of FIGURE 1 in greater detail.

FIGURE 7 is a schematic diagram of the diaphragm switch shown in its "open" condition.

FIGURE 8 is a sectional view showing a different embodiment of the present invention.

FIGURE 9 shows a still different embodiment of the present invention.

FIGURE 10 is a sectional view of yet another embodiment of the present invention.

Figure 1:
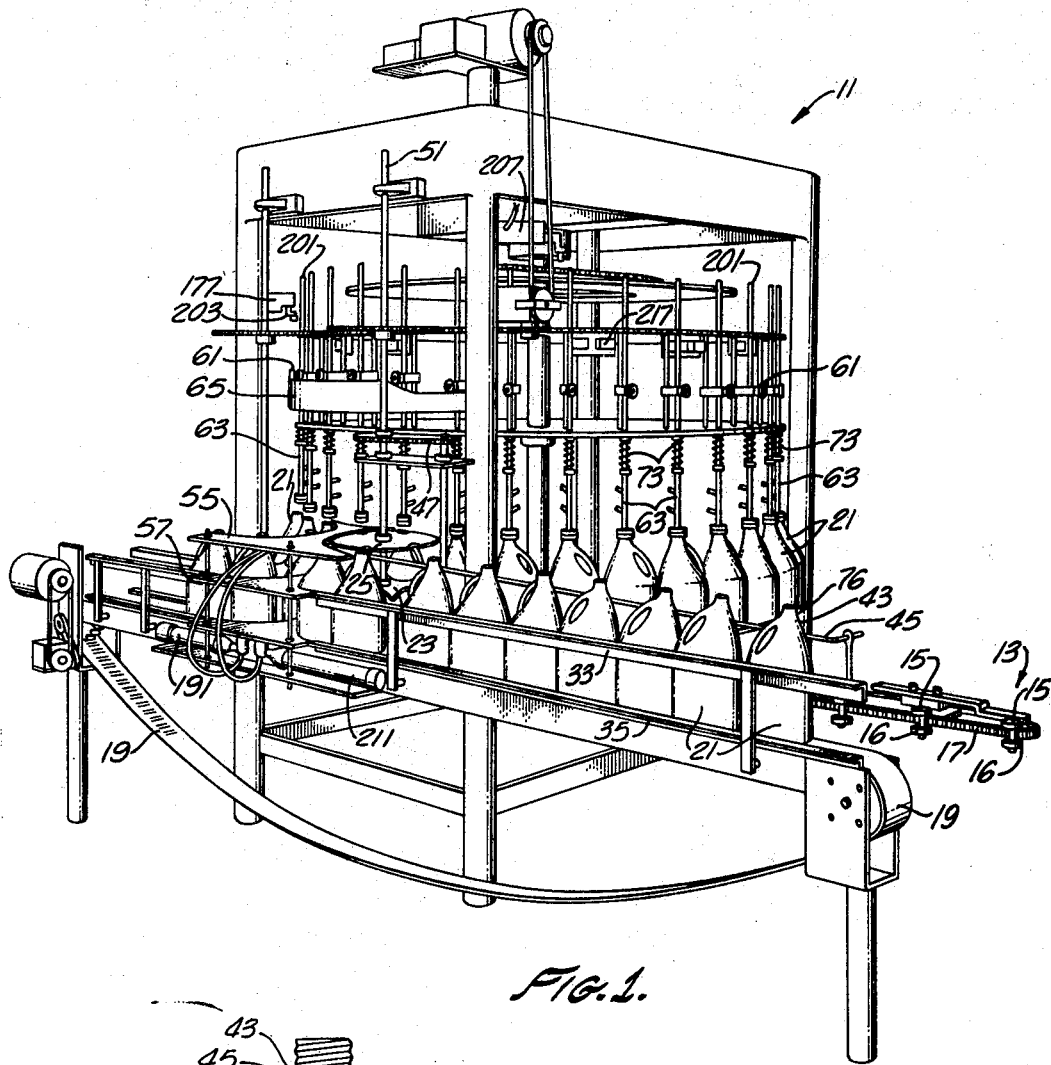
FIGURE 1 is an isometric view of a leak detector according to the present invention.

Turning now to the drawings, FIGURE 1 shows bottle tester 11 in operation, with skate-wheel assembly 13 having upper roller-skate wheels 15 and lower roller-skate wheels 16 connected to chain drive 17. Conveyor belt 19 supports the bottles 21 which are to be tested and conveys them toward in-feed body star 23 and neck star 25. The skate-wheel assembly will now be described in greater detail.

FIGURE 2 shows upper skate wheels 15 mounted on chain drive 17, which is driven by sprockets 27, 29 and 31. That portion of chain drive 17 lying between sprockets 29 and 31 lies above and substantially along the path of conveyor belt 19. That portion of chain drive 17 lying between sprockets 27 and 31 lies above and angularly disposed with respect to the path taken by conveyor belt 19.

Bottles 21 are initially loaded upon conveyor belt 19 in a somewhat random fashion. Conveyor belt 19, which moves towards the left in FIGURE 2, carries the bottles 21 towards the skate wheels at the location where they are supported by sprocket 31, until contact is made with the skate wheels by the bottles. Skate wheels 15 and 16 are spaced upon chain drive 17 so as to permit only one bottle to fit between adjacent skate wheels. Thus, regardless of the initially random positions of bottles 21 upon conveyor belt 19, as the bottles approach each upper and lower skate wheel pair, one pair forces its way between and separates each pair of adjacent bottles 21.

Conveyor belt 19 moves faster than does chain drive 17. Thus, the bottles 21 are moved ahead until each bottle contacts the skate wheel pair directly ahead of it. The next skate wheel pair separates the next bottle, which moves into place against that next skat wheel. Two bottles cannot fit between adjacent skate wheel pairs.

Figure 3:
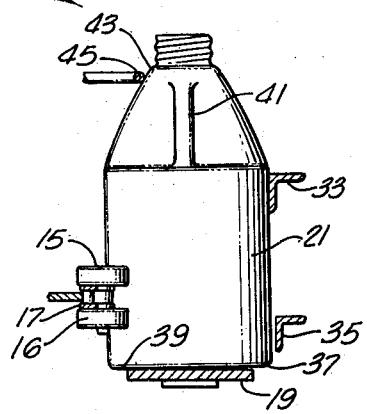
FIGURE 3 is an end view showing the relationship between the conveyor rail and skate-wheel assembly.

FIGURE 3 shows how upper conveyor rail 33 and lower conveyor rail 35, which are also shown in FIGURE 1, are positioned so that upper conveyor rail 33 is closer to the vertical projection of the skate wheels than is lower conveyor rail 35, and higher than upper skate wheels 15. As a consequence, the forces between conveyor belt 19 and the skate wheels, which are free to rotate, force the bottles towards and against upper conveyor rail 33, thereby tilting the bottom of the bottles away from lower skate wheels 16 and towards lower conveyor rail 35. This tilting of the bottle lifts the bottom of the bottle off conveyor belt 19 in the region 37 near lower conveyor rail 35 and allows the bottom of the bottle to make contact with conveyor belt 19 only in the region 39 near the skate wheels. The resulting forces rotate the bottles counterclockwise until the motion of an off-center protrusion such as handle 41 or shoulder 43, whichever is the most off-center, is stopped by orienter rail 45, which is shown more clearly in FIGURE 1.

Orienter rail 45 preferably slopes so that it first makes contact with a bottle at a location approximately where the shoulder and neck of the bottle join, and last makes contact with a bottle at a location approximately just under the threads for the bottle cap. In the absence of a slope, when the orienter rail first contacts the bottle directly on, a little ahead of, or a little behind the off-center protrusion, the bottle tends to bind between orienter rail 45 and conveyor rail 33. By sloping orienter rail 45, the bind is eliminated.

FIGURE 4 shows the bottles approaching the in-feed stars against upper conveyor rail 33 and the skate wheels in the correct sequence needed by the stars. The speed of the in-feed stars are synchronized with that of the skate wheels in a 1:1 ratio by chain drive 47, which passes around sprocket 48, which is mounted on the same axle as is sprocket 29, and sprocket 49, which is mounted on axle 51.

There are two in-feed stars, namely body star 23 having recesses 24, and neck star 25 having recesses 26. Recesses 24 and 26 have configurations conforming to the shapes of those portions of bottle 21 with which they come in contact, namely the body and neck portions, respectively. They control the bottles as they are deposited upon stationary table or transfer plate 53 by conveyor belt 19. Guides 55 and 57, shown more clearly in FIGURE 1, prevent the bottles from moving laterally away from the in-feed stars and force the bottles off conveyor belt 19 and onto table 53.

Figure 5:
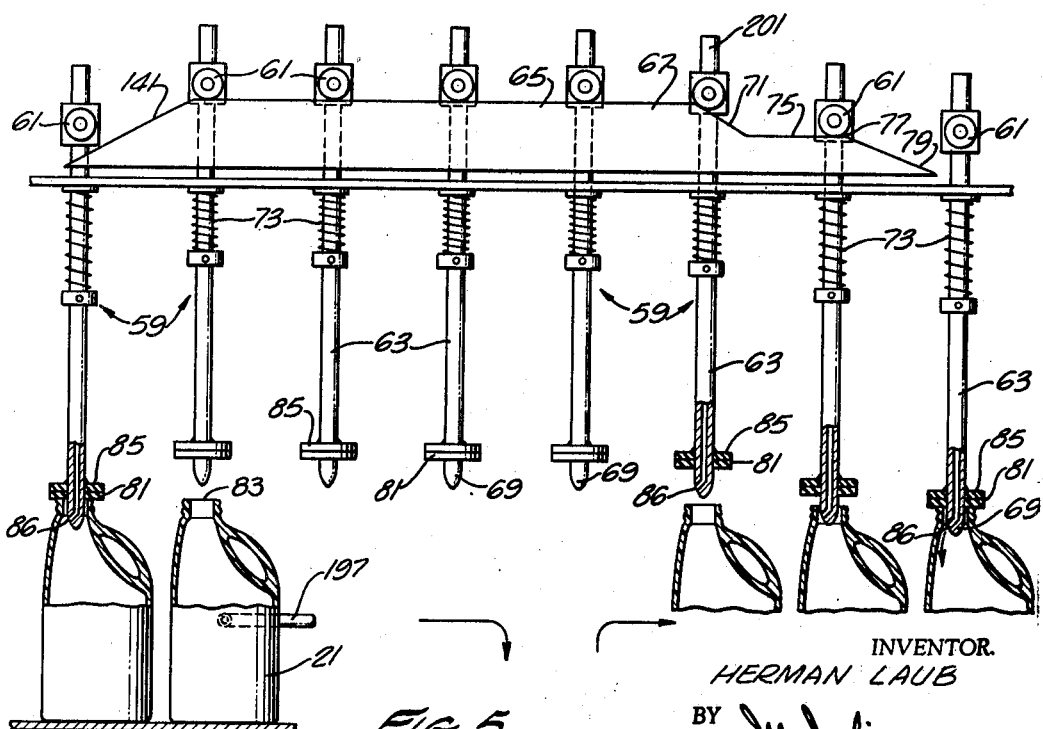
FIGURE 5 shows the cam follower assembly of a single test station.

FIGURE 5 shows the cam-follower assembly 59 of a typical test station. The tester shown in FIGURE 1 has 30 test stations, and each test station has a cam-follower assembly. Wheel 61 is mounted on shaft 63 and rides upon cam 65. When wheel 61 is riding upon surface 67, spout 69 is clear of the bottles 21. When wheel 61 passes point 71 and, through the aid of spring 73, drops to surface 75, spout 69 is lowered to a point where it is within the opening of the bottle, but is not necessarily in physical contact therewith. Spout 69 enters bottle 21 at the point of tangency between the in-feed stars and turntable 76. This position is held by spout 69 until bottle 21 is past neck star 25, so as to maintain control over bottle 21. When the bottle is free of neck star 25, wheel 63 passes point 77 of cam 65 and drops toward surface 79.

At this stage, the bottles are free and clear of the in-feed stars and spout 69 drops further into the bottle and spring 73 forces rubber sealing washer 81 tightly against opening lip 83 of bottle 21. Sealing washer 85 is made of soft rubber, while sealing washer 81 is made of a harder rubber or other resilient material. Both sealing washers are mounted securely upon shaft 63 just above orifice or opening 86 of spout 69.

A hard rubber or plastic material is preferred for sealing washer 81 so that if the top surface or lip 83 of the opening of bottle 21 is irregular and bumpy, the hard rubber will not fill up large irregularities. It is preferable to subsequently reject such a bottle as having a leak. The soft rubber backing washer 85 is used so that angular irregularities in an otherwise smooth bottle lip will merely cause the sealing washers to tilt slightly, and the bottle will not be rejected as a leaker solely by virtue of having a slanting lip that is not perfectly horizontal. The degree of hardness or softness of the washers controls their criticality of operation. A hardness range of from 30 to 100 Shore has been found to be satisfactory.

Figure 6:
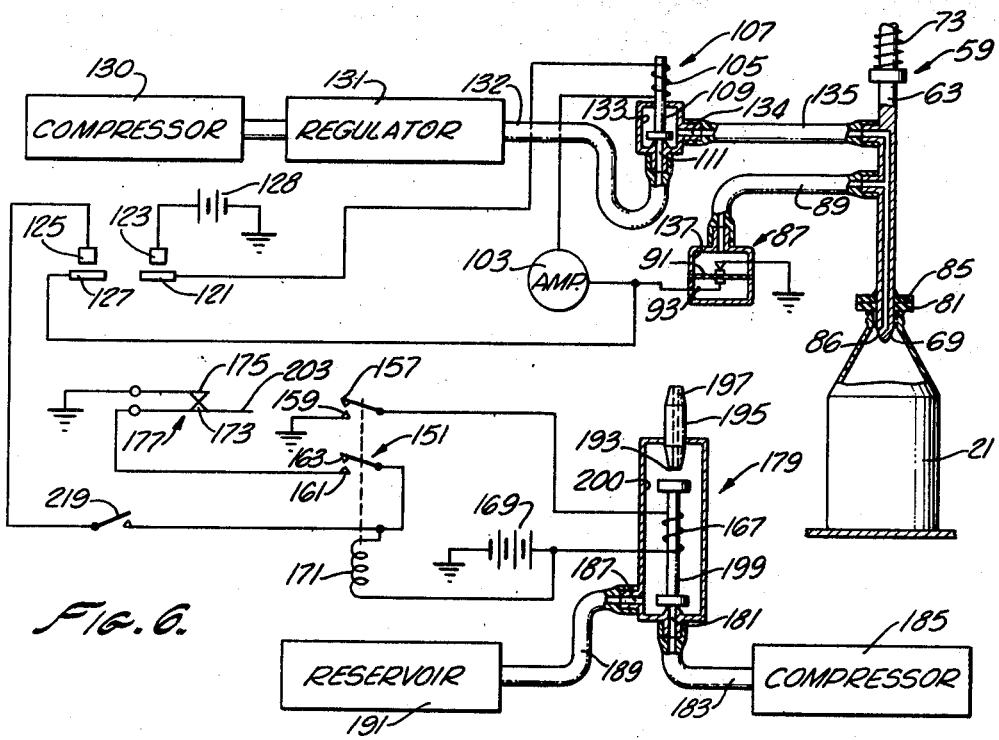
FIGURE 6 is a schematic diagram showing the electronic circuit associated with each test station, with the diaphragm switch in its "closed" condition.

FIGURE 6 shows how cam-follower assembly 59 of a typical test station is connected to diaphragm switch 87 for operation as a leak tester. Diaphragm switch 87 is normally in its electrically closed condition. That is, if the pressure supplied thereto through tube 89, which is also connected to the lower hollow portion of shaft 63, falls below a predetermined minimum, diaphragm 91 will be in the condition shown in FIGURE 6 and electrical current will be able to pass therethrough from terminal 93 to ground.

Terminal 93 is electrically connected to amplifier 103, which is in turn connected to solenoid coil 105 of normally closed two-way solenoid valve 107, as shown in FIGURE 6. In this condition, plunger 109 seals port 111, preventing the passage of air therethrough. The other end of solenoid coil 105 is connected to commutator segment 121, which is associated with brush 123. Brush 125 is associated with commutator segment 127. Brush 123 is connected to the positive terminal of battery 128. The operation of the circuit shown in FIGURES 6 and 7 will now be described.

Prior to spout 69 entering bottle 21, both diaphragm switch 87 and solenoid valve 107 are electrically inactive and in their "closed" conditions, as shown in FIGURE 6. It should be noted that in FIGURE 6, the brushes are not in physical contact with their respective commutator segments. After spout 69 enters bottle 21 and the opening of bottle 21 is sealed by sealing washer 81, stationary "hot" brush 123 is physically brought into contact with commutator segment 121 by the rotation of disc 129, shown in FIGURE 4, upon which the commutator segments 121 are mounted. One commutator segment 121 is present for each cam-follower assembly. This contact completes the electrical circuit through solenoid coil 105, thereby "opening" solenoid valve 107 by causing plunger 109 to rise, and allowing air to flow from compressor 130 through pressure regulator 131 to tube 132 and then through port 111 into chamber 133. The air then flows out of chamber 133 through port 134 to tube 135, and thence to the lower hollow portion of shaft 63 and out through opening 86 in spout 69 into bottle 21, building up the air pressure therein and within chamber 137 of switch 87.

If there is no leak in bottle 21, the air pressure will build up until diaphragm 91 is forced into the position shown in FIGURE 7, which "opens" diaphragm switch 87, thereby opening the circuit to solenoid coil 105. This causes plunger 109 to drop back down, sealing port 111, and preventing additional air from being supplied through "closed" solenoid valve 107 to bottle 21. After a predetermined period of time such as a few seconds, which is long enough to make certain that there are no small leaks in bottle 21, physical contact between "hot" brush 123 and commutator segment 121 is terminated by the further rotation of disc 131. Commutator segment 127 is then mechanically forced into physical contact with "read" brush 125 by the rotation of disc 139, upon which the commutator segments 127 are mounted. One commutator segment 127 is present for each cam-follower assembly. No current will flow in the "read" circuit because diaphragm switch 87 is "open." Physical contact between "read" brush 125 and commutator segment 127 is terminated after a predetermined time interval such as a few seconds by the further rotation of disc 139.

Wheel 61 then rides up incline 141 of cam 65, as shown in FIGURE 5, until it reaches surface 67, thereby removing spout 69 from within bottle 21. As soon as the seal between washer 81 and bottle 21 is broken, the pressure within chamber 137 of diaphragm switch 87 falls, and diaphragm 91 returns to its normally "closed" position as shown in FIGURE 6. Since "hot" brush 123 is no longer in contact with commutator segment 121, however, no power is supplied to solenoid coil 105.

Turntable 76 then carries leakless bottle 21 around into a position between arm 143 of guide 55 and discharge start 145, until bottle 21 is deposited upon stationary table 147 and held in place between recess 149 of discharge start 145 and guides 55 and 57, which prevent the bottles from moving laterally away from discharge star 145. Recess 149 has a configuration conforming to the shape of that portion of the body of bottle 21 with which it comes in contact. Discharge star 145 then deposits bottle 21 upon conveyor belt 19, which transports the bottles to a collection area.

If there is a leak in bottle 21, the air pressure therein will alternately build up and fall while "hot" brush 123 is in contact with commutator segment 121, causing diaphragm switch 87 alternately to "open" and "close," respectively, if the leak is large enough. When contact between "hot" brush 123 and commutator segment 121 is broken, if diaphragm switch 87 is "open," it will soon "close," and if it is "closed," it will remain so, because the pressure will drop and solenoid valve 107, which will then be electrically disconnected, will remain "closed."

Now when contact is made between "read" brush 125 and commutator segment 127, current will flow in the "read" circuit through "closed" diaphragm switch 87 and to double pole double throw (DPDT) relay 151, which holds itself closed after commutator segment 127 loses contact with "read" brush 125. Relay 151 will now be described in detail.

Relay 151 has normally-open pairs of contacts 157 and 159, and 161 and 163. Contact 157 is connected to three-way reject solenoid coil 167, the other end of which is connected to the positive terminal of battery 169. Contact 159 is grounded. Contact 161 is connected to normally closed contacts 173 and 175 of switch 177. Contact 163 is connected to "read" brush 125 and to relay coil 171 of relay 151. The other end of coil 171 is connected to the positive terminal of battery 169.

When "read" brush 125 comes in contact with commutator segment 127, power is supplied to coil 171, which closes contacts 157 and 159, and 161 and 163. The latter pair of contacts enables current to pass from battery 169 through coil 171 and then to ground through closed contacts 173 and 175. Thus, coil 171 will remain activated and switch 151 will hold itself "closed" even after "read" brush 125 and commutator segment 127 are no longer in contact. Contacts 157 and 159 close the circuit through three-way reject solenoid coil 167.

Three-way reject solenoid valve 179 has bottom port 181, which is connected by means of tube 183 to compressor 185, side port 187, which is connected by means of tube 189 to reservoir 191, and top port 193, which is connected by means of tube 195 to reject nozzle 197. When coil 167 is activated, plunger 199 rises and seals port 193, while opening port 181. This permits the air in compressor 185 to pass through tube 183 and port 181 into chamber 200, and then through port 187 and tube 189 into reservoir 191, until reservoir 191 becomes charged with air.

When top 201 of shaft 63 of cam-follower assembly 59 reaches a predetermined position, as shown in FIGURE 1, it mechanically trips arm 203 of switch 177, thereby opening normally closed contacts 173 and 175, and breaking the hold circuit of coil 171. As a consequence, contacts 157 and 159 open, and the circuit activating three-way solenoid 179 is opened, allowing plunger 199 to drop and seal port 181, while opening port 193. This allows the air in reservoir 191 to exhaust through reject nozzle 197, thereby blowing the defective bottle which contains a leak off turntable 76 into a reject-bottle container. It is important in the timing of when top 201 is to trip arm 203, that spout 69 should already have been withdrawn from bottle 21, but that it be before bottle 21 has left turntable 76 for discharge star 145, and while it is positioned in front of reject nozzle 197.

In the event that one of the test stations becomes defective, the entire cam-follower assembly associated therewith can be put out of operation by manually removing the spout 69 and placing a tube or pipe over the shaft 63. The tube or pipe triggers switch 207, which activates a circuit so as to discharge air through nozzle 209, which is connected to compressor 211 by means of tube 213, as shown in FIGURE 4, thereby blowing off all bottles that would otherwise be tested by the defective station. This is done so that the operator will know that those bottles are being blown off because the station is defective and out of order. Otherwise, the bottles would be blown off by reject nozzle 197, as if they had been tested and rejected for being defective, even though they did not contain any leaks.

In order to aid in the determination that one of the test stations is defective, each test station is provided with a counter 217 which counts every time three-way reject solenoid 179 is activated. If one test station rejects significantly more bottles than do the other test stations, it indicates that the fault lies in the existence of a defective station, not in the presence of defective bottles.

In order to prevent erroneous readings on counter 217 from occuring because of the absence of a bottle, the "read" circuit is provided with read or bottle switch 219, which remains open unless it is closed by the presence of a bottle 21 in the test station. Thus, if a bottle is present, it trips or closes switch 219, and the "read" circuit functions as already herein described. If no bottle is present in the test station, switch 219 remains open, and the "read" circuit remains inoperative, so that counter 217 does not count the absence of a bottle as the presence of a bottle containing a leak.

FIGURE 8 shows how the present invention can also be used to test for leaks in other devices such as bungs and pop-top lids, by making a bottomless container a part of the tester. The lower portion of cam-follower assembly 221 is fixedly connected as by screwing to bell-shaped metal container 223, which is similar to a jar with its bottom removed. Rubber gasket 225 is cemented to the open bottom lip of container 223 to provide an airtight seal with the object being tested. Since metal container 223 and the remainder of the testing apparatus are known to be airtight, if the pressure falls within chamber 227, it will indicate that the pop-top lid or bung 229 which is being tested contains a leak therein.

FIGURE 9 shows rubber glove 233 inserted over tubular mandrel 235, which contains opening 237 at the tip thereof. Mandrel 235 is equivalent to cam-follower assembly 59 and opening 237 serves as does spout 69. The glove 233 which is to be tested is manually inserted over mandrel 235 and fastened securely thereto in an airtight seal. When the pressurized air fills up chamber 239, glove 233 can be tested for leaks as were bottles 21. Although glove 233 is made of stretchable rubber, the slight pressures required for testing and the thickness of the rubber are such that leaks will be detected before the pressure within chamber 239 is large enough to stretch the glove and distort the readings.

FIGURE 10 shows rubber condom 251 inserted over hollow steel mandrel 253, which contains opening 255 at the tip thereof. The condom 251 which is to be tested is manually inserted over mandrel 253 and fastened securely thereto. Bell-shaped container 257, which is equivalent to the lower portion of cam-follower assembly 59, is then lowered over condom 251, and an airtight seal is obtained between condom 251 and container 257 all around the base of mandrel 253, as at region 259.

Bell-shaped container 257 is made of porous bronze and contains an impervious layer 261 on the outer surface thereof. Tube 263, corresponding to shaft 63, is coupled to a vacuum pump, instead of to a compressor. Instead of the test compartment being filled with air under pressure, a vacuum is created. This necessitates using a diaphragm switch which is forced into its electrically "open" condition when a vacuum is applied, instead of when pressure is applied.

When the vacuum is applied, condom 251 is caused to inflate and lie flat against the inner surface of porous bronze container 257. Compartment 265 is at atmospheric pressure through openings 255 and 267. If there are any holes in condom 251, the vacuum within tube 263 and container 257 will decrease, and the leak will be detected.

If preferred, tube 263 could be connected to opening 255 and impervious layer 261 omitted. The vacuum pump could then be replaced by the compressor system of FIGURE 6.

While particular embodiments of the present invention have been shown and described, it will be obvious to those skilled in the art that changes and modifications may be made without departing from this invention in its broader aspects, and, therefore, the aim is to cover all such changes and modifications which fall within the true spirit and scope of this invention.

I claim:
1. Apparatus for testing plastic containers, comprising:
  (a) a plurality of test stations, each including a spout,
  (b) conveyor means for transporting said containers toward and away from said test stations,
  (c) means for aligning said containers with said test stations, and coupling the spout thereof to the container to be tested,
  (d) sealing means for sealing said spout to said container,
  (e) means for injecting pressurized air through said spout into said container, including a two-way solenoid valve which is normally closed,
  (f) means for determining whether said air is escaping from said container at a rate greater than a predetermined maximum, including pressure-sensitive means coupled to said spout, said pressure-sensitive means having a first condition when the air pressure therein in less than a predetermined amount, and a second condition when the air pressure therein is greater than said predetermined amount, said pressure-sensitive means reverting to its first condition when air escapes from said container at a rate greater than said predetermined maximum, said two-way solenoid valve being closed when said pressure-sensitive means is in its second condition,
  (g) means for uncoupling said spout from said container, and
  (h) rejection means for rejecting the containers that have leaks greater than said predetermined maximum.

2. Apparatus as defined in claim 1, in which said pressure-sensitive means is coupled to the coil of a relay which holds itself closed when it is activated, until a pair of normally closed contacts are opened, and including means operable when said coil of said relay is inactivated, for activating said rejection means.

3. Apparatus as defined in claim 2 in which said means for aligning and coupling includes coaxially aligned rotating neck and body support members, each having a plurality of recesses conforming to the configuration of that portion of said containers with which it comes in contact.

4. Apparatus as defined in claim 3 in which said means for aligning and coupling includes a cam and a cam-follower assembly, said cam causing said spout to enter said container when said container is at the point of tangency between said rotating neck and body support members and the turntable associated with said test stations.

5. Apparatus as defined in claim 4 in which said sealing means includes a resilient sealing washer and in which said cam has a configuration which forces said sealing means against the opening of said container when said container is upon said turntable and clear of said rotating neck and body support members.

6. Apparatus as defined in claim 5 in which said means for uncoupling said spout includes a configuration of said cam which causes said spout to rise out of said container after it has been tested.

7. Apparatus as defined in claim 2 in which said conveyor means includes a conveyor belt, a plurality of pairs of skate wheels, and a conveyor rail means.

8. Apparatus as defined in claim 7 in which said pairs of skate wheels are horizontally supported along and higher than at least a portion of the path taken by said conveyor belt, each pair comprising one skate wheel coaxially disposed above the other skate wheel, and in which said skate wheels are conveyed toward said test stations at a slower rate than that at which said conveyor belt is moving.

9. Apparatus as defined in claim 8 in which said conveyor rail means is positioned along at least a portion of the path taken by said conveyor belt and higher than said pairs of skate wheels, said skate wheels and said conveyor rail being spaced sufficiently close to prevent said containers from passing therebetween, and horizontally adjacent skate wheels being spaced sufficiently close to each other to prevent more than one of said containers from fitting therebetween.

10. Apparatus for testing plastic containers, comprising:
  (a) a plurality of test stations, each including a spout,
  (b) conveyor means for transporting said containers toward said test stations,
  (c) means for sequentially aligning one of said containers with one of said test stations, and coupling the spout thereof to the container to be tested,
  (d) sealing means for sealing said spout to said container,
  (e) means for injecting pressurized air through said spout into said container including a two-way solenoid valve which is normally closed,
  (f) means for determining whether said air is escaping from said container at a rate greater than a predetermined maximum, including pressure-sensitive means coupled to said spout, said pressure-sensitive means having a first condition when the air pressure therein is less than a predetermined amount, and a second condition when the air pressure therein is greater than said predetermined amount, said pressure-sensitive means reverting to its first condition when said air escapes from said container at a rate greater than said predetermined maximum, said two-way solenoid valve being closed when said pressure-sensitive means is in its second condition,
  (g) means for uncoupling said spout from said container,
  (h) ejection means which ejects from said apparatus those containers that caused said pressure-sensitive means to revert to its first condition, and
  (i) conveyor means for transporting away from said test stations the containers that have not been ejected by said ejection means.

11. Apparatus as defined in claim 10, in which said pressure-sensitive means is coupled to the coil of a relay which holds itself closed when it is activated, until a pair of normally closed contacts are opened, and including means operable when said coil of said relay is inactivated, for activating said ejection means.

12. Apparatus for testing plastic containers, comprising:
  (a) a plurality of test stations, each including a spout,
  (b) conveyor means for transporting said containers toward said test stations,
  (c) means for sequentially aligning one of said containers with one of said test stations, and coupling the spout thereof to the container to be tested,
  (d) sealing means for sealing said spout to said container,
  (e) means for injecting pressurized air through said spout into said container,
  (f) means for determining whether said air is escaping from said container at a rate greater than a predetermined maximum, including a diaphragm switch coupled to said spout, said diaphragm switch having a first condition when the air pressure therein is less than a predetermined amount, and a second condition when the air pressure therein is greater than said predetermined amount, said diaphragm switch reverting to its first condition when said air escapes from said container at a rate greater than said predetermined maximum, (g) means for uncoupling said spout from said container, (h) ejection means which ejects from said apparatus those containers that caused said diaphragm switch to revert to its first condition, said ejection means including a brush and a commutator coupled to said diaphragm switch and to the coil of a relay which holds itself close once it is activated, until a pair of normally closed contacts are opened, and which, when closed, activates the coil of a three-way solenoid, said pair of normally closed contacts being opened when said container reaches a predetermined position, and (i) conveyor means for transporting away from said test stations the containers that have not been ejected by said ejection means.

13. Apparatus as defined in claim 12 in which said three-way solenoid has a first port coupled to an air compressor, a second port coupled to an air reservoir, and a third port coupled to an air nozzle, said first port being closed and said third port being open when said three-way solenoid coil is not activated, and said first port being open and said third port being closed when said three-way solenoid coil is activated, whereby a burst of air from said air nozzle is caused to strike a container having a leak greater than said predetermined maximum.

14. Apparatus for testing plastic containers, comprising:

(a) a plurality of test stations, each including a spout, (b) conveyor means for transporting said containers toward said test stations, (c) means for sequentially aligning one of said containers with one of said test stations, and coupling the spout thereof to the container to be tested, (d) sealing means for sealing said spout to said container, (e) means for injecting pressurized air through said spout into said container, (f) means for determining whether said air is escaping from said container at a rate greater than a predetermined maximum, including pressure-sensitive means coupled to said spout, said pressure-sensitive means having a first condition when the air pressure therein is less than a predetermined amount, and a second condition when the air pressure therein is greater than said predetermined amount, said pressure-sensitive means reverting to its first condition when said air escapes from said container at a rate greater than said predetermined maximum, (g) means for uncoupling said spout from said container, (h) ejection means which ejects from said apparatus those containers that caused said pressure-sensitive means to revert to its first condition, (i) conveyor means for transporting away from said test stations the containers that have not been ejected by said ejection means, and (j) reject means for triggering a stream of air at a predetermined time when one of said test stations is not operating properly, said blast of air ejecting those containers which would otherwise be tested by that test station; and switch means which closes the electrical circuit operating a test station only when a container is in its proper position in said test station.

15. Apparatus for testing plastic containers, comprising:

(a) a plurality of test stations, each including a spout, (b) conveyor means for transporting said containers toward and away from said test stations, (c) means for aligning said containers with one of said test stations, and coupling the spout thereof to the container to be tested, (d) sealing means for sealing said spout to said container, (e) means for injecting pressurized air through said spout into said container, (f) means for determining whether said air is escaping from said container at a rate greater than a predetermined maximum, including pressure-sensitive means coupled to said spout, said pressure-sensitive means having a first condition when the air pressure therein is less than a predetermined amount, and a second condition when the air pressure therein is greater than said predetermined amount, said pressure-sensitive means reverting to its first condition when said air escapes from said container at a rate greater than said predetermined maximum, (g) means for uncoupling said spout from said container, and (h) rejection means for rejecting the containers that have leaks greater than said predetermined maximum, said pressure-sensitive means being coupled to the coil of a relay which holds itself closed when it is activated, until a pair of normally closed contacts are opened, and including means operable when said coil of said relay is inactivated, for activating said rejections means.

16. Apparatus for testing plastic containers, comprising:

(a) means for forming a chamber with the container to be tested serving as at least a portion of the wall of said chamber, (b) means for varying the pressure within said chamber, (c) means for rejecting defective containers, and (d) means for determining whether the pressure within said chamber is varying at a rate greater than a predetermined amount, including pressure-sensitive means coupled to the coil of a relay which holds itself closed when it is activated, until a pair of normally closed contacts are opened, and including means operable when said coil of said relay, is inactivated, for activating said rejecting means.

17. Conveyor means for transporting a plurality of containers, comprising:

(a) a conveyor belt, (b) a plurality of pairs of rotatable wheels horizontally supported along and higher than at least a portion of the path taken by said conveyor belt, each pair comprising one wheel coaxially disposed above the other wheel, and said wheels moving horizontally at a slower rate than that of said conveyor belt, (c) a conveyor rail positioned along at least a portion of the path taken by said conveyor belt and higher than said pairs of wheels, said wheels and said conveyor rail being spaced sufficiently close to prevent said containers from passing therebetween, and horizontally adjacent wheels being spaced sufficiently close to each other to prevent more than one of said containers from fitting therebetween, said containers being made of deformable, resilient and plastic material, and (d) a second conveyor rail positioned parallel to and lower than the first mentioned conveyor rail but more distant from the vertical projection of said pairs of wheels than is said first mentioned conveyor rail.

References Cited

UNITED STATES PATENTS 2,547,729  4/1951  Aiken _____ 198—34
3,101,848  8/1963  Uhlig _____ 209—72

LOUIS R. PRINCE, Primary Examiner

JEFFREY NOLTON, Assistant Examiner

U.S. Cl. X.R.

198—34